United States Patent Office 2,902,509
Patented Sept. 1, 1959

2,902,509
β-DIETHYLAMINOETHYL ESTER OF ETHYL α-PHENYL-α-ETHYLMALONATE AND SALTS THEREOF

Paolo Galimberti, Pavia, Italy, assignor to Societa Italiana Prodotti Schering, Milan, Italy No Drawing. Application November 15, 1957
Serial No. 696,627
Claims priority, application Italy November 23, 1956

4 Claims. (Cl. 260—475)

The present invention relates to novel compounds with pharmacological activity.

More particularly this invention is concerned with the β-diethylaminoethyl ester of ethyl-α-phenyl-α-ethylmalonate (hereinafter designed as FEM), of the formula

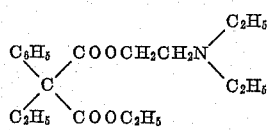

and its mineral acid addition salts.

The compounds of the invention have shown a particular activity as spasmolytics. Particularly, they are many times more active than papaverine in preventing the muscular contraction caused by acetylcholine. At a concentration of $1.10^{-4}$ M, FEM prevents by 86% the colon contraction induced by acetylcholine in guinea pigs. On the other hand in analogous tests, at a concentration of $5.10^{-4}$ M the compound prevented by 87% the contraction by barium chloride and by 83% the contraction caused by histamine. In comparison with atropine, FEM showed also a remarkable degree of spasmolytic activity. Thus, FEM has the feature of a spasmolytic with both myolytic and atropinic activity.

The acute toxicity in experimental animals is very low. In young mice, the 50% convulsant dose ($CD_{50}$) is 170 mg./kg. The $LD_{50}$ is also very high, being 262 mg./kg. In rats, doses of 100 mg./kg. are still safe.

In chronic toxicity tests in growing rats with daily doses of 10 mg./kg. the animals show no toxic phenomena. With daily doses of 20 mg./kg, 40% of the animals die within 30 days; with doses of 50 mg./kg. mortality rises to 60% within 30 days. FEM has been found free of any topic irritating action up to a concentration of $1.10^{-3}$ when instilled into the conjunctival sac of rabbits, into the skin tissue of rabbit ear, into the subcutaneous and muscular tissues of rats, guinea pigs and rabbits, into the peritoneum of mice and into the vein of rabbits. The compounds of the invention show also other interesting pharmacological properties. On the isolated guinea pig heart, FEM displays negative inotropic and chronotropic action in vitro starting from doses corresponding to 10 γ. When administered intravenously to narcotized rabbits it does not markedly affect either arterial pressure in doses up to 0.1 mg./kg., or breath in doses up to 5–10 mg./kg., and fails to produce apparent ecgraphic troubles, except a slight and fugaceous tachycardia with doses up to 1.5–2 mg./kg. intravenously. Another interesting aspect of FEM is the control of bronchospasms experimentally induced in guinea pigs by administration of acetylcholine and histamine. This action is observed with intravenous doses as low as 0.02 mg./kg. With subcutaneous doses of 50–100 mg./kg. it protects rats from the experimental ulcer according to Shay. On the abdominal rectal muscle of frogs it does not show acetylcholine like action even at a concentration of $5.10^{-5}$ M.

FEM is prepared by heating to reflux the monoethylester of α-phenyl-α-ethylmalonic acid with an equivalent amount of β-diethylaminoethyl chloride in a lower aliphatic alcohol, preferably ethanol, in the presence of an excess over an equivalent amount of an alkali metal hydroxide. After the mixture is cooled, the formed alkali metal chloride is filtered off, the alcohol is removed by distillation in vacuo and the residue is rectified.

The so-obtained β-diethylaminoethyl ester of ethyl α-phenyl-α-ethylmalonate may be converted into its mineral acid addition salts by reaction with an equivalent amount of the selected mineral acid. For therapeutical purposes we prefer to prepare the hydrochloride or the hydrobromide.

The following example clearly illustrates the invention.

Example

A solution of 60 g. potassium hydroxide in 150 ml. distilled water and 150 ml. 95% ethyl alcohol is added quickly to a solution of 264 g. diethyl α-phenyl-α-ethylmalonate in 150 ml. 95% ethyl alcohol, taking care that the temperature does not exceed 30° C. The mixture is stirred for 6 hours, then all of the ethyl alcohol is distilled in vacuo. After cooling, the unreacted diethyl α-phenyl-α-ethylmalonate is extracted with petroleum ether and the aqueous layer is acidified to Congo red with concentrated hydrochloric acid. Ethyl α-phenyl-α-ethylmalonate precipitates and is collected in vacuo and purified by dissolving it in 5% sodium hydroxide and reprecipitating it with concentrated hydrochloric acid. The precipitate is filtered, washed with water and dried in an oven at 50°. M.P. 92–94° C. Yield 180 g. (76% of the theoretical amount).

To a solution of 52 g. ethyl α-phenyl-α-ethylmalonate in 80 ml. anhydrous ethyl alcohol a solution of 14.5 g. potassium hydroxide in 70 ml. anhydrous ethyl alcohol is added. To the obtained mixture 30 g. β-diethylaminoethyl chloride are quickly added and the mixture is refluxed for 3 hours. After cooling the precipitated potassium chloride is filtered off and ethyl alcohol is distilled away by heating in vacuo. The residue is distilled in vacuo under 4 mm. pressure collecting at 188–190° C. Yield 62 g. (82%) of β-diethylaminoethyl ester of ethyl α-phenyl-α-ethylmalonate.

To obtain, for instance, the hydrobromide of FEM, one part by weight of FEM is dissolved in 20 parts by volume of anhydrous ethyl ether and an amount by weight of hydrogen bromide corresponding to four times the calculated theoretical amount is bubbled into the solution. The hydrobromide precipitates and is collected, washed with ethyl ether and dried well in vacuo over phosphorus pentoxide. M.P. 88–89° C.; yield quantitative.

I claim:

1. A compound of the class consisting of the β-diethylaminoethyl ester of ethyl α-phenyl-α-ethylmalonate of the formula

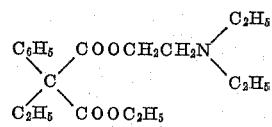

and its mineral acid addition salts.

2. The β-diethylaminoethyl ester of ethyl α-phenyl-α-ethylmalonate.

3. The hydrochloride of the β-diethylaminoethyl ester of ethyl α-phenyl-α-ethylmalonate.

4. The hydrobromide of the β-diethylaminoethyl ester of ethyl α-phenyl-α-ethylmalonate.

References Cited in the file of this patent
UNITED STATES PATENTS

| | | |
|---|---|---|
| 1,036,624 | Horlein | Aug. 27, 1912 |
| 2,094,608 | Kritchevsky | Oct. 5, 1937 |